US009020923B2

(12) United States Patent
Hierons et al.

(10) Patent No.: US 9,020,923 B2
(45) Date of Patent: Apr. 28, 2015

(54) SYSTEMS AND METHODS TO FACILITATE MEDIA SEARCH

(75) Inventors: Ian Paul Hierons, Los Angeles, CA (US); Christine Russell, Los Angeles, CA (US); Seth Kaplan, Los Angeles, CA (US)

(73) Assignee: Score Revolution, LLC, Hollywood, CA (US)

( * ) Notice: Subject to any disclaimer, the term of this patent is extended or adjusted under 35 U.S.C. 154(b) by 0 days.

(21) Appl. No.: 13/526,226

(22) Filed: Jun. 18, 2012

(65) Prior Publication Data
US 2013/0339343 A1   Dec. 19, 2013

(51) Int. Cl.
*G06F 7/00* (2006.01)
*G06F 17/30* (2006.01)

(52) U.S. Cl.
CPC .... *G06F 17/30752* (2013.01); *G06F 17/30755* (2013.01); *G06F 17/30743* (2013.01); *G06F 17/30749* (2013.01); *G06F 17/30769* (2013.01)

(58) Field of Classification Search
None
See application file for complete search history.

(56) References Cited

U.S. PATENT DOCUMENTS

| | | | |
|---|---|---|---|
| 7,081,579 B2 | 7/2006 | Alcalde et al. | |
| 7,263,497 B1 * | 8/2007 | Wiser et al. | 705/51 |
| 7,279,629 B2 | 10/2007 | Hinman et al. | |
| 7,838,755 B2 * | 11/2010 | Taub et al. | 84/609 |
| 2007/0089057 A1 | 4/2007 | Kindig | |
| 2007/0282860 A1 * | 12/2007 | Athineos et al. | 707/10 |
| 2009/0277322 A1 * | 11/2009 | Cai et al. | 84/609 |
| 2011/0289452 A1 | 11/2011 | Jordan et al. | |
| 2012/0030230 A1 | 2/2012 | Sheinkop et al. | |
| 2013/0339853 A1 | 12/2013 | Hierons et al. | |
| 2014/0180762 A1 * | 6/2014 | Gilbert | 705/7.29 |

OTHER PUBLICATIONS

Secord et al., "Creating Collections with Automatic Suggestions and Example-Based Refinement", UIST '10, pp. 249-258, 2010, ACM).*
Cui et al., "QueST: Querying Music Databases by Acoustic and Textual Features", MM '07, pp. 1055-1064, 2007, ACM.*
Tzanetakis et al., "Beyond the Query-By-Example Paradigm: New Query Interfaces for Music Inromation Retrieval", In Proc. Int. Computer Music Conferences, pp. 177-183, 2002.*

(Continued)

*Primary Examiner* — Michael Hicks
(74) *Attorney, Agent, or Firm* — Greenberg Traurig LLP

(57) ABSTRACT

Graphical user interfaces for searching music. A computer provides a window of a first webpage providing a user interface to search music, comprising search tools including filter tools and a keyword search tool. In response to a user search request for music via the filter tools and/or the keyword search tool, the computer provides, within the window, music search results. When a search result is selected by the user, the selected search result expands within the window. The expanded search result includes one or more of: a grab button, a download button, a share button, a license button, an audio player showing an audio waveform of the selected music search result, a description of the selected music search result, artwork associated with the search result, and an explore-more button, that when selected provides additional music related to the selected music based on acoustic similarity.

20 Claims, 18 Drawing Sheets

(56) References Cited

OTHER PUBLICATIONS

APM Music, "The APM Story; About APM Music and Vision", 1 page, downloaded Jun. 26, 2012. Available at: http://www.apm-music.com/about-apm-music-and-vision.

Extreme Music, "About; The Music Supervisor's Weapon of Choice", 2 pages, downloaded Jun. 26, 2012. Available at https://www.extrememusic.com/About/index.html.

* cited by examiner

Your Projects   + Add project >>   Quote request >> New Search

⌐ 900

Back   Quote request for track "Manuscript"

Your Projects
♡ Favorites           1
☐ New Project         2
☐ New Project         0
☐ New Project         0
☐ New Project         0

Please provide or update the following information

Contact Name          E-mail Address              Phone Number
[Jenn Schell]         [Jenn@score-revolution.com]—910

Licensee Company Name    Licensee Address —915
                    —920

Project Title
                    —930

Type of Media            Scene Description —925
[Select...]              Please give a brief description of what's
                         happening in the scene the music will
Term                     be played under.
    —935

Effective Date—945       Rights Requested—940
                         Length of Use —950

Select trailer music to add to your selection ⟵ 1505

○ Intro    unique, brings us into story
○ Middle    building, driving
○ End    builds, big/epic, crescendo
○ Strings/Bumps
○ FX
○ Show all trailer tracks

Select film genres to add to your selection ⟵ 1510

| ☐ Action | ☐ Adventure |
| ☐ Comedy | ☐ Drama |
| ☐ Family | ☐ Fantasy |
| ☐ Film Noir | ☐ Horror |
| ☐ Indie | ☐ Romance |
| ☐ Romantic Comedy | ☐ Suspense |

Fig. 15

SYSTEMS AND METHODS TO FACILITATE MEDIA SEARCH

FIELD OF THE TECHNOLOGY

The present disclosure relates to media, and more specifically to graphical user interfaces for searching music and presenting relevant search results.

BACKGROUND

There are media applications configured to organize, play, download, save digital music and video files on various computing devices, such as desktop computers, notebook computers, tablet computers, personal media players, mobile phones, etc. Media, such as music, can be purchased and/or downloaded to a media player (e.g., an iPod) using a computer (e.g., via iTunes®). Some of the media applications allow a user to enter one or more keywords to search for relevant songs from an online marketplace and select and purchase a song, and download the purchased song on to a personal computing device for subsequent personal use.

Some web-based services allow a user to submit one or more keywords to search for songs of interest. Search results are typically presented in a list; and the user may select a song from the list for streaming to a media player embedded in the web browser for playing while the web browser displays the search result page.

Some applications, such as Moodagent™, create music profiles for songs and use the music profiles to recommend music from the web, create playlists from desktop library, and/or explore collection of music based on mood profile.

SUMMARY OF THE DESCRIPTION

In one aspect, a window of a web browser is configured via a webpage to provide a user interface to search music, such as film music. The user interface includes a plurality of search tools, such as a set of filter tools linked to a keyword search tool. In response to a user search request received via at least one of the search tools, the graphical user interface configured within the window of the web browser presents a set of music search results.

In one embodiment, when a search result corresponding to a track of film music is selected by the user, the selected film music search result expands within the window of the web browser to reveal user interface elements relating to the track of film music. The expanded search result includes one or more user interface elements, such as an action button, an audio player showing a waveform representation of the audio of the track of film music, a description of the track of film music, artwork associated with the track of film music, and an "explore-more" button that, when selected, provides search results of additional film music related to the track of film music based on acoustic similarities between the track of film music and the additional film music.

In one embodiment, the user interface includes a tool that allows the user to upload a track of music to request a search engine coupled with the web server providing the webpage to identify search results that contain music tracks that are ranked and/or selected based on acoustic similarities between the uploaded track of music and respective music tracks in the search results.

In one embodiment, the action button can include one or more of a license button enabling licensing of the film music (one or more terms of which can be adjusted based on an intended use), a share button enabling sharing of the film music with another person, a grab button enabling dragging of the film music to a folder to organize a licensing project, and/or a download button enabling downloading of the film music.

In one embodiment, the expanded search result includes itemized information relating to the film music search result. In one embodiment, the expanded search result includes additional results by either a composer or full score of the search result.

In one embodiment, the filter tools are configured to filter search results by comparing the keywords entered by the user with the keywords associated with music. In one embodiment, the keywords received in the keyword search tool and applicable to the filter tools are automatically identified and applied to the respective filter tools. In one embodiment, the filter tools can be used to adjust the search and filtering criteria to view updated results without leaving the current webpage to start a new search. In one embodiment, the filter options are organized in the filter tools via hierarchical groups. A user may specify a filter option via entering a corresponding keyword in the keyword search tool, or selecting the option using the filter tool.

In one embodiment, the user interface allows the user to submit a quote request for a quote to commercially license the music identified in the music search result.

Although described with respect to the search of music, such as film music, the graphical user interface and the search engine described herein can be performed on various musical content, such as television programs, a track, a trailer, a movie, an advertisement, a game, Internet content, etc.

These and other aspects and embodiments will be apparent to those of ordinary skill in the art by reference to the following detailed description and the accompanying drawings.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

In the drawing figures, which are not to scale, and where like reference numerals indicate like elements throughout the several views:

FIG. 9 is a user interface provided via the server computer that enables a user to submit a quote request for a commercial license of particular media in accordance with an embodiment of the present disclosure;

FIG. 10 is a user interface provided via the server computer that displays a set of filter tools in accordance with an embodiment of the present disclosure;

FIG. 11 is a user interface provided via the server computer that displays a filter tool configured to filter based on music genres in accordance with an embodiment of the present disclosure;

FIG. 12 is a user interface provided via the server computer that displays a filter tool configured to filter based on music genres in accordance with another embodiment of the present disclosure;

FIG. 13 is a user interface provided via the server computer that displays a filter tool configured to filter based on tempo in accordance with an embodiment of the present disclosure;

FIG. 15 is illustrates a filter tool configured to filter based on trailer characteristics and a filter tool configured to filter based on film characteristics in accordance with an embodiment of the present disclosure;

DETAILED DESCRIPTION

Figure 1:
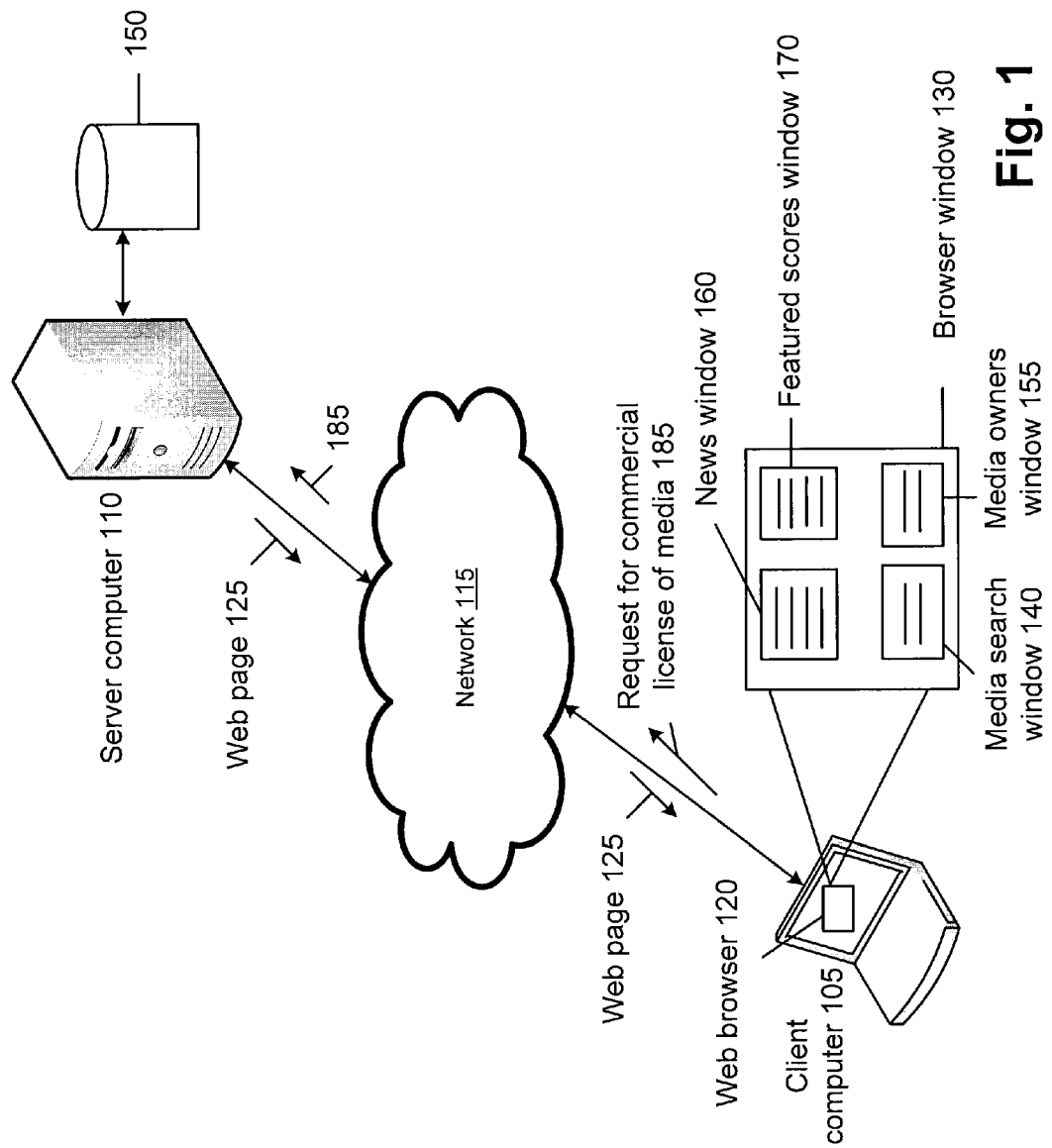
FIG. 1 is a block diagram of a client computer communicating with a server computer over a network in accordance with an embodiment of the present disclosure.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment or a different embodiment; and the phrase "in another embodiment" as used herein does not necessarily refer to a different embodiment. It is intended, for example, that claimed subject matter include all different combinations of example embodiments in whole or in part.

In general, terminology may be understood at least in part from usage in context. Fore example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 is a block diagram of an embodiment of a client computer 105 communicating with a server computer 110 over a network 115 such as the Internet. A user uses a web browser 120 on the client computer 105 to access the Internet. In one embodiment, server computer 110 transmits a webpage 125 via the network 115 to the client computer 105 for display by the web browser 120 in a browser window 130.

For purposes of this disclosure, a computer such as the client computer 105 includes a processor and memory for storing and executing program code, data and software. Computers can be provided with operating systems that allow the execution of software applications in order to manipulate data. Client computer 105 can be any device that can display a website and that can be used by a user. Personal computers, servers, personal digital assistants (PDAs), wireless devices, smartphones, cellular telephones, tablet computers, internet appliances, media players, home theater systems, and media centers are several non-limiting examples of computers.

For the purposes of this disclosure, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server. A number of program modules and data files can be stored on a computer readable medium of the server. They can include an operating system suitable for controlling the operation of a networked server computer, such as the WINDOWS 7, WINDOWS VISTA, or WINDOWS XP operating system published by Microsoft Corporation of Redmond, Wash., or the Ubuntu operating system distributed by Canonical Ltd. of Douglas, Isle of Man. In one embodiment, the server computer 110 is a group of servers (e.g., a server farm).

Figure 2:
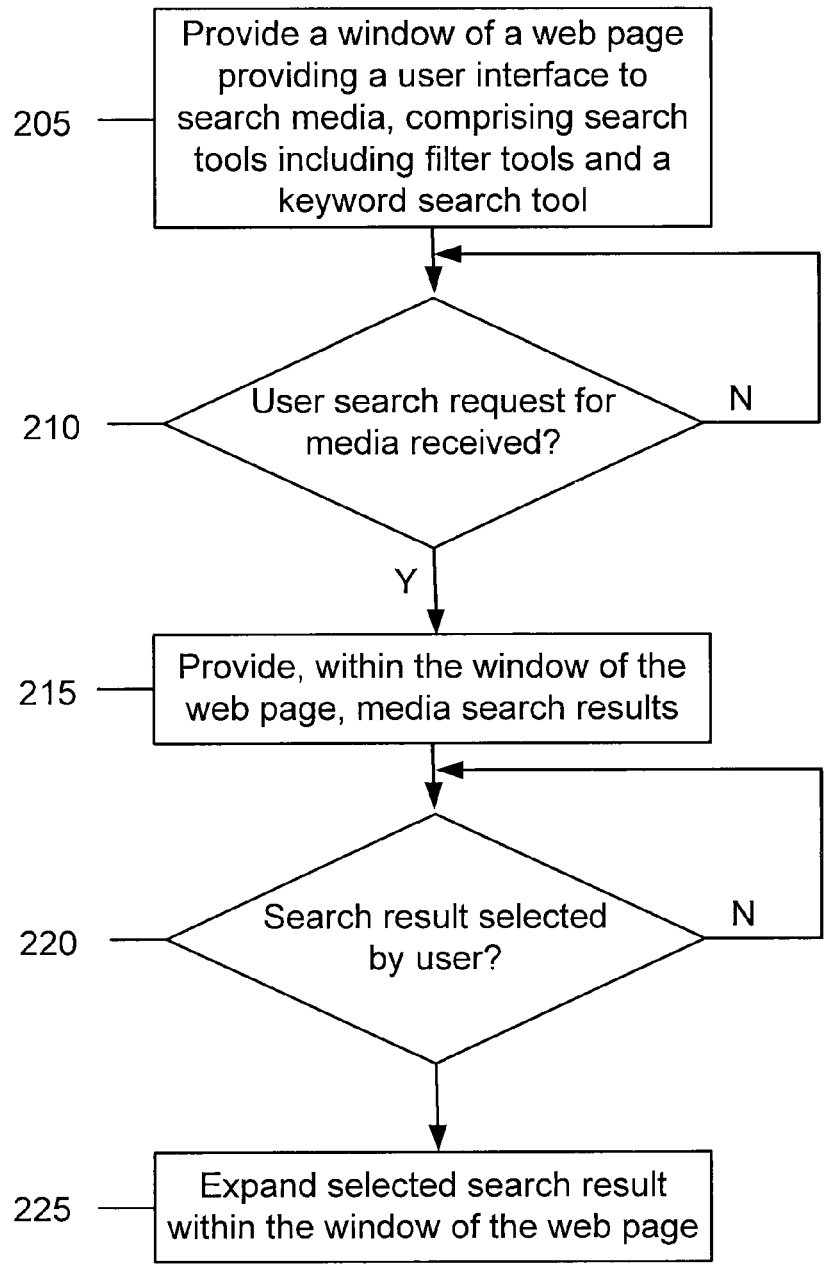
FIG. 2 is a flowchart illustrating operations performed by the server computer to enable the searching of and commercial licensing of a media in accordance with an embodiment of the present disclosure.

Also referring to FIG. 2, in one embodiment the webpage 125 provides a user interface including search tools (shown as media search window 140) that include a set of filter tools and a keyword search tool (Operation 205). In one embodiment, the client computer 105 (e.g., webpage 125) determines if the user submits a search request for media (e.g., film music) via the filter tools and/or the keyword search tool (Operation 210). Examples of filtering criteria that can be selected (at different times or at the same time) via one or more filter tools include tempo, music genre, vibe, film genre, instruments, theme, trailer music, and/or ensemble.

In one embodiment, the filter tools and the keyword search tool are linked together, thereby enabling the user to search using keywords and filter the search results (e.g., based on metadata associated with the track(s)). In one embodiment, the filter tools can be used to filter the search results of a keyword search without initiating a new search (e.g., without leaving the current webpage and loading a separate, new webpage). The filter tools allow the user to refine or broaden the search by adding or eliminating search criteria without leaving the current webpage showing the search results. In one embodiment, when a keyword entered in the keyword search tool matches a filtering option in a filter tool, the keyword is identified and applied on the filter tool in connection with the keyword search. In one embodiment, a search can be started with a filter tool; and the search result can be filtered using a further filter tool and/or the keyword search tool, without initiating a separate search.

In response to a user search request for media via the filter tools and/or the keyword search tool, the server computer 110 provides within the same window of the webpage 125 a set of media search results (Operation 215). The client computer 105 (e.g., webpage 125) then determines if the user selects one of the media search results (e.g., film music search result) (Operation 220). If so, the selected media search result expands within the window of the webpage 125 (Operation 225).

In one embodiment, the search results are film music and the selection of a film music search result expands within the window of the webpage 125 to include one or more of an action button, an audio player including a waveform representing audio of the selected film music search result, a description of the selected film music search result, artwork associated with the search result, itemized information relating to the film music search result, additional results by either a composer or full score of the search result, and/or an explore-more button that, when selected, provides additional film music related to the selected film music.

The search results can include media such as film music, television content, a track, a trailer, a movie, an advertisement, a game, and/or Internet content that can be commercially licensed. In one embodiment, the user can play the media on the client device 105. In one embodiment, the media is streamed from the server computer 110 to the client computer 105 when the user plays the media. The search tools (media search window 140) can be displayed in any manner and in any position on webpage 125.

In one embodiment, when a user uses the search tools (media search window 140) to perform a search for media, the webpage 125 communicates this search request to the server computer 110. The server computer 110 searches a database 150 having a catalog of media (e.g., film music) that can be commercially licensed. The database 150 may be part of the server computer 110 or may be in communication with the server computer 110.

Figure 12:
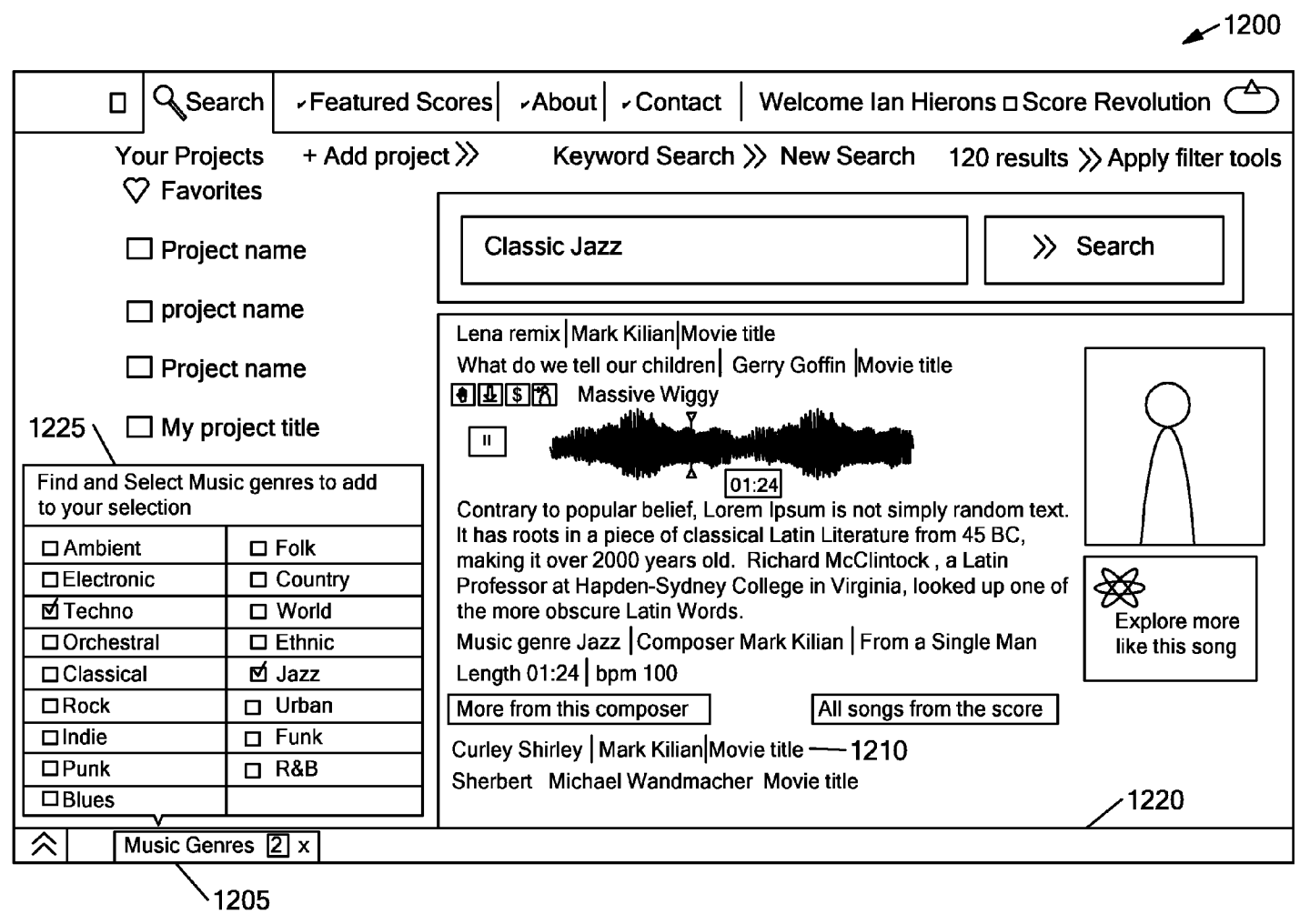

As described above, the search tools (media search window 140) can include a keyword-enabled search. For example, the user may enter "Classic jazz" as a keyword search and the media search window 140 will return jazz scores. In one embodiment, the jazz scores returned as search results are music from one or more movies. In one embodiment, since the keywords "Classic" and "jazz" matching options in filter tools, the keywords "Classic" and "jazz" are highlighted in the region 605 and filtering options corresponding to "Classic" and "jazz" are automatically applied to the search. For example, the keyword "jazz" causes the system to use the "Jazz" filtering option in the filter tool configured to filter based on music genres, as illustrated in FIG. 12.

In one embodiment, when a user enters a keyword that is not in the database for tagging music tracks, the keyword is grayed out. In some embodiments, keywords used in the database for tagging music have corresponding filtering options in the filtering tools; and the user may use the filtering tools by entering the respective keywords in the keyword search tool 605.

In one embodiment and as described above, the search tools (media search window 140) can also provide one or more filter tools to facilitate finding media for a user. Examples of filter tools are illustrated in FIGS. 10-15 and discussed below in connection with the respective figures.

In one embodiment, the graphical user interface allows a user to explore and discover music tracks that are similar to a track identified in a search result. For example, in one embodiment, once a user locates media that the user is interested in, a graphics user interface element (e.g., an "explore-more" button 870 illustrated in FIG. 8) can be selected to request a search based on acoustic similarity with the media. In response to the request, the server computer 110 is configured to locate other media that is acoustically similar to that media. In one embodiment, other media that is acoustically similar to the media selected from the search results may not be similar to the selected media in classification identified by keywords. For example, if a user selects a search result obtained using the keywords "Classic Jazz" and presses an "explore-more" button associated with a selected track identified in the search result, the "explore-more" button causes the user interface to identify pieces of music that are not classified via the keywords "Classic Jazz" but classified under some other categories but acoustically similar to the selected track (e.g., in terms of tempo, density, rhythmic patterns, intensity of attack that are determined based on the analysis of the audio signals of the tracks). In one embodiment, the acoustic similarity provides the similar feel to a listener. In one embodiment, the system is configured to allow the user to license music and not make a playlist (e.g., a playlist of "Classic Jazz"), providing a search result that gives the similar listening experience in a different genre can provide the user with fresh ideas and suggestions of other approaches that might be taken to meet licensing needs. For example, after a user initiates a search by entering "hip-hop" in the keyword search tool, results matching the keyword "hip-hop" are displayed. Results matching the keyword "hip-hop" would typically include such acoustic elements as a steady electronic drone, a pronounced (electronically generated) beat structure, a sensual melody, and in some cases a sprinkling of sampled or real acoustic instrumentation. If the user selects the "explore-more" button associated with a search result, the server computer 110 can identify a track of music that is suggestive of an Indian Raga, which also includes a steady drone, a pronounced and similar beat pattern, and sensual melodic attributes. The user may find that this unexpected result is a more creative choice than what he/she originally imagined, thereby providing value for the user by way of a completely new approach to search.

In one embodiment, the music tracks are indexed/profiled based on a computerized analysis of the audio signals in the music tracks. In one embodiment, the acoustic attribute profile includes numerical measurements generated from the audio signals and/or acoustic characterizations based on matching of audio signals or patterns. In one embodiment, at least some of the attributes in the profiles of the music tracks are not based on keywords and cannot be searched via keywords. In one embodiment, the acoustic profiles of the music tracks are used to determine the degree of acoustic similarity with a track identified by the user (e.g., via the "explore-more" button 870 illustrate in FIG. 8, or a track uploaded by the user via the user interface illustrated in FIG. 16); and the music tracks are sorted according to the degree of similarity and presented in the order from most similar to less similar.

In one embodiment, the filter tools can be used to filter the search results initiated via the keyword based search or an acoustic similarity based search, without starting a new search.

In one embodiment, the filter tools are configured to filter out media that have keywords that do not match the keywords or filter options entered by the user. The keywords or filter options may include track mood, instrumentation, film title, composer, music genre, or any other parameter or criteria that can be associated with media.

In one embodiment, the web page 125 also includes a media owners window 155. The media owners window 155 enables an owner of media to upload their media to the database 150 and therefore enable users to license the media. In one embodiment, the media owners window 155 enables the server computer 110 to allow the owner to enter into a business arrangement with the operating entity of the server computer 110 to represent the media owner's media on the site.

The webpage 125 can also include a news window 160 that shows news (e.g., general news, news about a particular music track, news relating to media selected by the user, etc.). The webpage 125 can also include a featured scores window 170 that displays information about media (e.g., that a user has selected).

In one embodiment, after the user selects a search result (e.g., a film music search result that the user wants more information about (or may want to license)), the webpage 125 can display an audio player including a waveform representing audio of the selected media search result. The waveform can be viewed while, for example, a sample of the media is playing. The waveform can illustrate which parts of the media have already been downloaded (e.g., streamed) from the server computer 110 and which parts have not been downloaded (e.g., streamed) from the server computer 110. In one embodiment, the waveform can be manipulated by the user, such as by enabling the user to selectively listen to a segment of the media instead of the entire media.

In one embodiment, the user selects a search result (e.g., film music track) and decides that the user wants to license the media (e.g., film music track). In one embodiment, the user uses the webpage 125 to transmit a request 185 to the server computer 110 for a commercial license of the media. In one embodiment, the webpage 125 provides a user interface for requesting a quote for a commercial license of the media and for identifying an intended media. In one embodiment, the request 185 includes the request to license particular media and the intended media use. In one embodiment, the server computer 110 receives the request 185 and communicates with the owner of the media. In one embodiment, the licensing terms vary depending on the intended media use. In one embodiment, the request 185 includes a scene description during which the media will be played.

Figure 3:
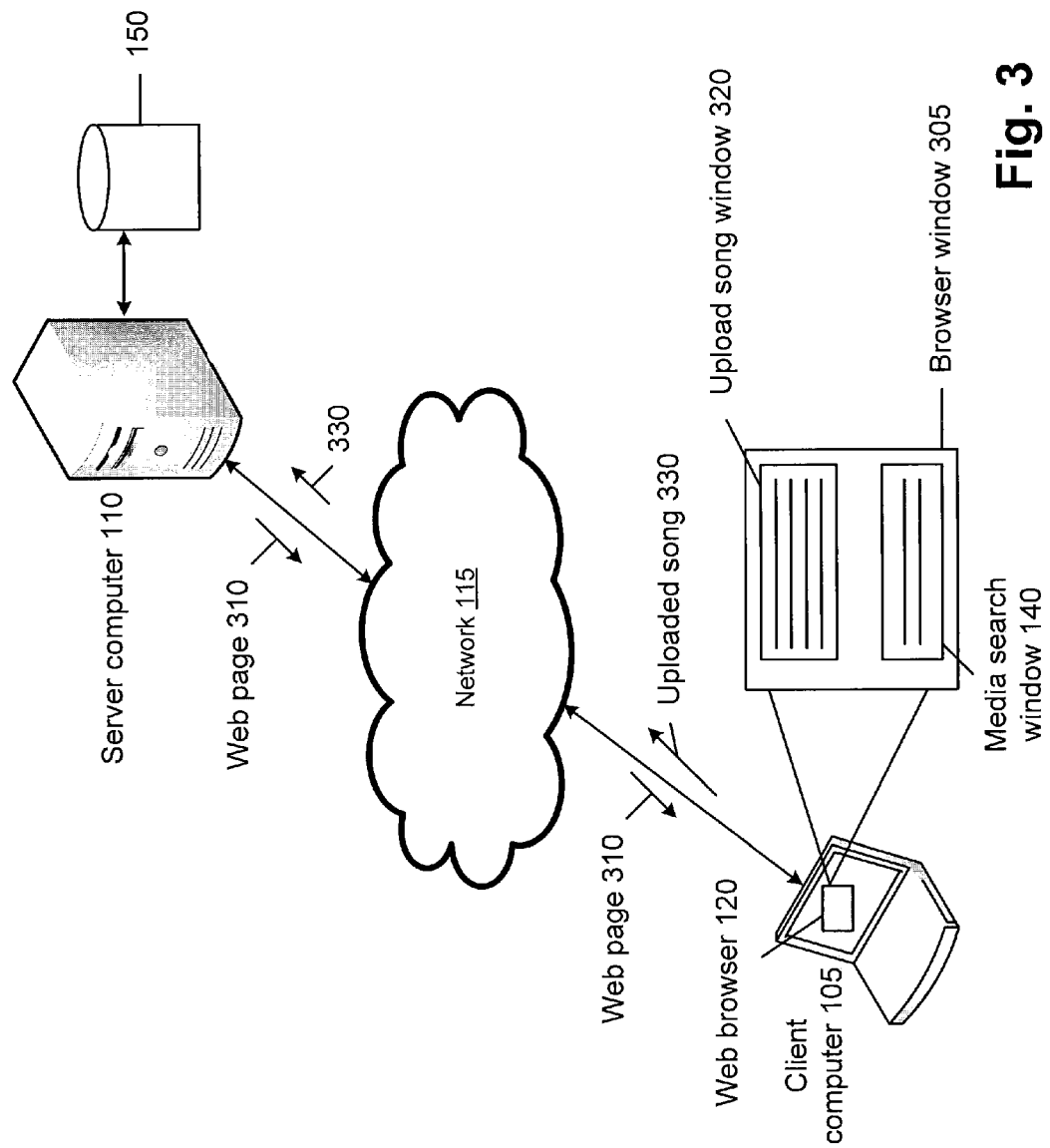
FIG. 3 is a block diagram of the client computer communicating with the server computer over the network in accordance with one embodiment of the present disclosure.

FIG. 3 is a block diagram of one embodiment of a browser window 305 of webpage 310. As described above, in one embodiment the server computer 110 stores a catalog of music in database 150. The webpage 310 causes the web browser 120 to display, in one embodiment, a media search window 140 and an upload track window 320 for the searching of music. Although shown with two windows/panels 140, 320, the browser window 305 and webpage 310 may include any number of windows/panels, such as some or all of the windows described with respect to FIG. 1 in addition to windows 140, 320. In one embodiment, the upload track window 320 is displayed after the user selects a search option on the webpage 125 or 310, such as after the user selects an option in the media search window 140.

In one embodiment, the upload track window 320 prompts the user to upload a track to the server computer 110. In one embodiment, the webpage 310 displays a waveform representation of the uploaded track. The user may upload a track via the upload track window 320 so that the user can find other tracks stored in the database 150 that are similar to the uploaded track based on acoustic attributes or acoustic profiles.

In one embodiment, the server computer 110 and/or a different computer connected to the server computer 110 determines the acoustic attributes, or the acoustic profile, of the uploaded track and then uses these acoustic attributes to locate other tracks in the catalog 150 that are most similar to the acoustic attributes, or the acoustic profile, of the uploaded track. In one embodiment, the user interface presented via the webpage 310 allows the user to identify a segment of the uploaded track and request the presentation of a list of tracks that are most similar to the acoustic attributes, or the acoustic profile, of the user specified segment of the uploaded track.

In one embodiment, the server computer 110 identifies search results based solely on an analysis of acoustic attributes of the uploaded music track and not based on words associated with the uploaded music track. In one embodiment, the server computer 110 identifies search results based not only on similarity in the acoustic attributes but also on the matching of one or more metadata in the database with criteria entered by the user (e.g., via entered via a filter tool or a keyword search tool).

For example, suppose the user uploads a track via the upload track window 320. In one embodiment, the client computer 105 transmits uploaded track 330 to the server computer 110, or a separate computer connected to the server computer 110 via a network, such as the Internet. The server computer 110 and/or the separate computer analyzes the uploaded track 330 and determines that a set of audio measurements of the uploaded track 330 as the acoustic attributes, such as tempo, density, rate of attack, harmonics, etc. The server computer 110 can evaluate a similarity indicator between the acoustic attributes of the uploaded track 330 and the acoustic attributes of the tracks in the database 150. The server computer 110 can then transmit information about these most similar tracks to the client computer 105 for display on the webpage 310. If the user selects one of these tracks, the server computer 110 streams the selected track to the webpage 310. In one embodiment, the user can then decide whether to request a license for the selected track.

In one embodiment, the client computer 105 determines the acoustic attributes of the uploaded track (e.g., that the uploaded track has a medium tempo) and then only transmits the acoustic attributes of the uploaded track to the server computer 110. The server computer 110 then identifies similar tracks based on the acoustic attributes.

In one embodiment, the server computer 110 determines the acoustic qualities, acoustic attributes, or acoustic profile of the uploaded track (e.g., tempo or beat pattern). In one embodiment, the server computer 110 uses the services of another entity, such as Moodagent™, to determine the acoustic qualities, acoustic attributes, or acoustic profile of the uploaded track and/or to determine the similarity indicator.

Figure 4:
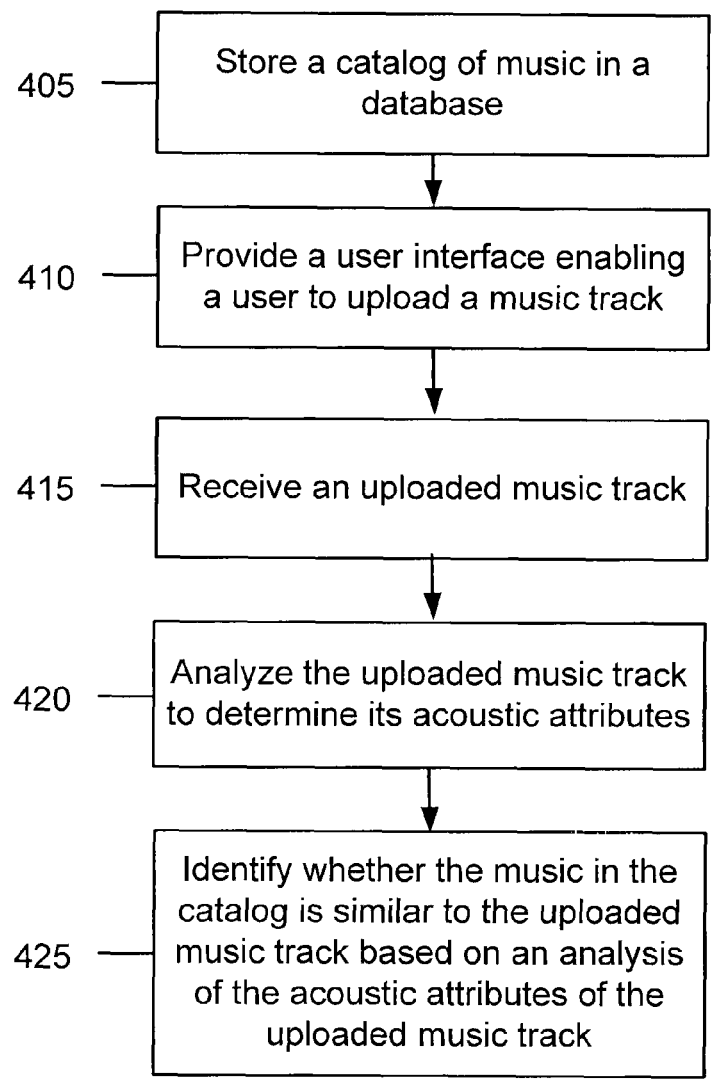
FIG. 4 is a flowchart illustrating operations performed by the server computer to enable a user to upload a music track and to selectively present music in a catalog in an order based on acoustic similarity between the uploaded music track and the respective music tracks in the catalog in accordance with an embodiment of the present disclosure.

FIG. 4 is a flowchart illustrating an embodiment of operations performed by the server computer 110. As described above, the server computer 110 stores a catalog of music in database 150 (Operation 405). The server computer 110 then provides a user interface enabling a user to upload a music track (Operation 410). In one embodiment, the user uploads a music track and the server computer 110 receives the uploaded music track (Operation 415) from the client computer 105. In one embodiment, the server computer 110, or a third party computer connected to the server computer 110, analyzes the uploaded music track to determine one or more acoustic attributes associated with the uploaded music track (Operation 420). These acoustic attributes of a music track (or other media) can include, for example, moods, tempo, vocals, density, rhythmic patterns, intensity of attack, and instrumentation. In one embodiment, the server computer 110 identifies whether any music in the catalog (database 150) is sufficiently similar to the uploaded music track based on an analysis of the acoustic attributes of the uploaded music track (Operation 425). In one embodiment, the similarity with the uploaded music track in acoustic attributes is used to rank the music tracks in the database 150; the top ranking tracks are selected for presentation to the user; and the tracks are presented in the order of decreasing similarity.

Figure 5:
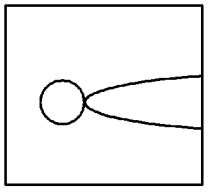
FIG. 5 is a user interface provided via the server computer that displays news and enables a user to search film music in accordance with an embodiment of the present disclosure.

FIG. 5 is an example of a user interface 500 that includes a button 505 for unregistered users to register and a button 510 for users to sign in. The user interface 500 also includes a news window 515 to display news related to, for example, a selected media track. As described above, the user interface 500 also includes search tools 520 (media search window) and a media owners window 525.

Figure 6:
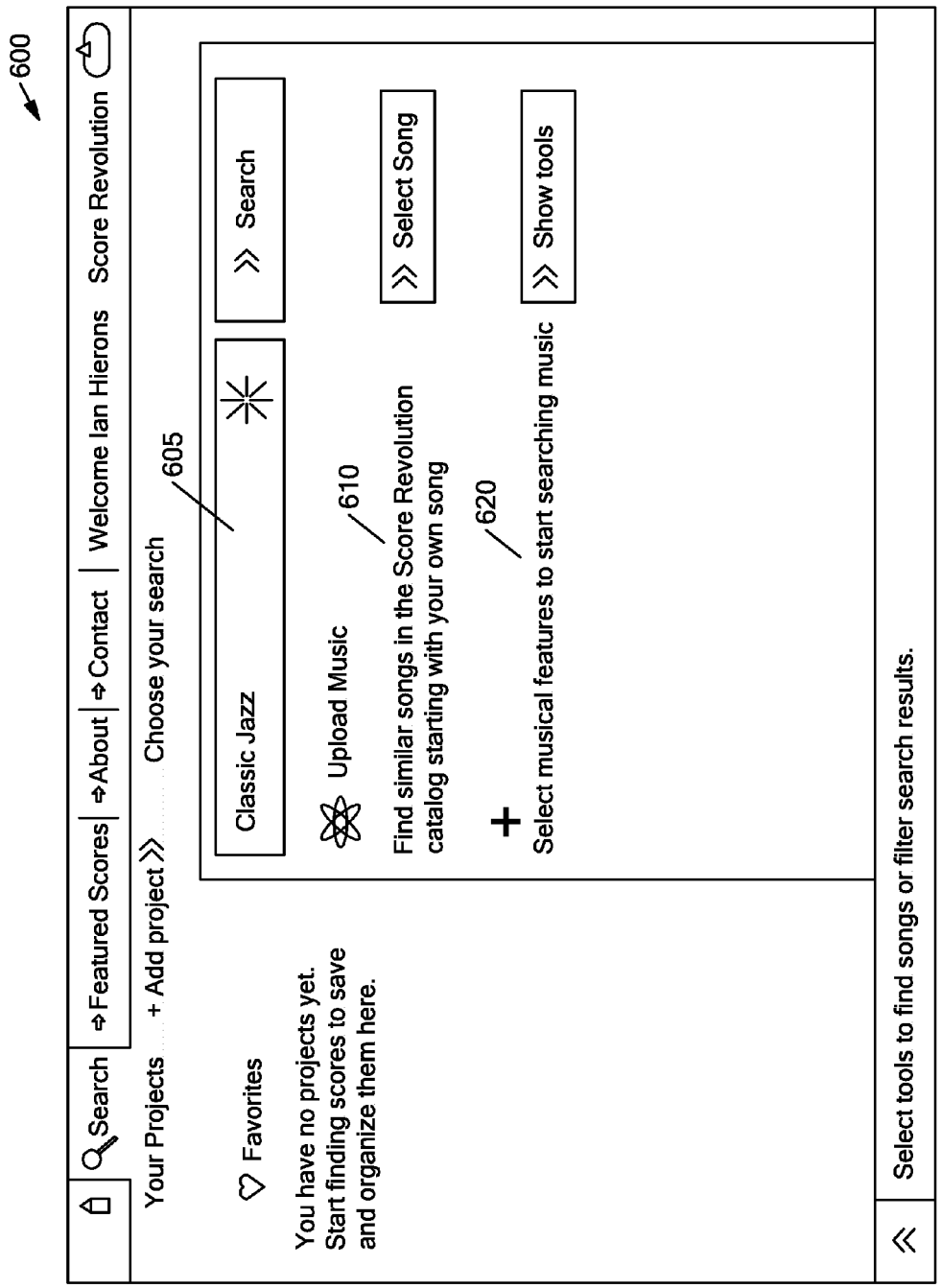
FIG. 6 is a user interface provided via the server computer that includes a keyword search tool that allows a user to enter keywords for a search in accordance with an embodiment of the present disclosure.

FIG. 6 is an example of a user interface 600 that includes a user entering keywords into search tool 605. The user in this embodiment enters "Classic jazz" to perform a keyword search for media in the catalog. In this embodiment, the search interface also includes a user interface element 610 to invoke an upload music window where the user can upload a music track and find music tracks in the catalog that are acoustically similar to this uploaded music track. As described above, the search tool interface can also include a user interface element 620 to invoke filter tools enabling the user to filter the catalog using acoustic attributes.

Figure 7:
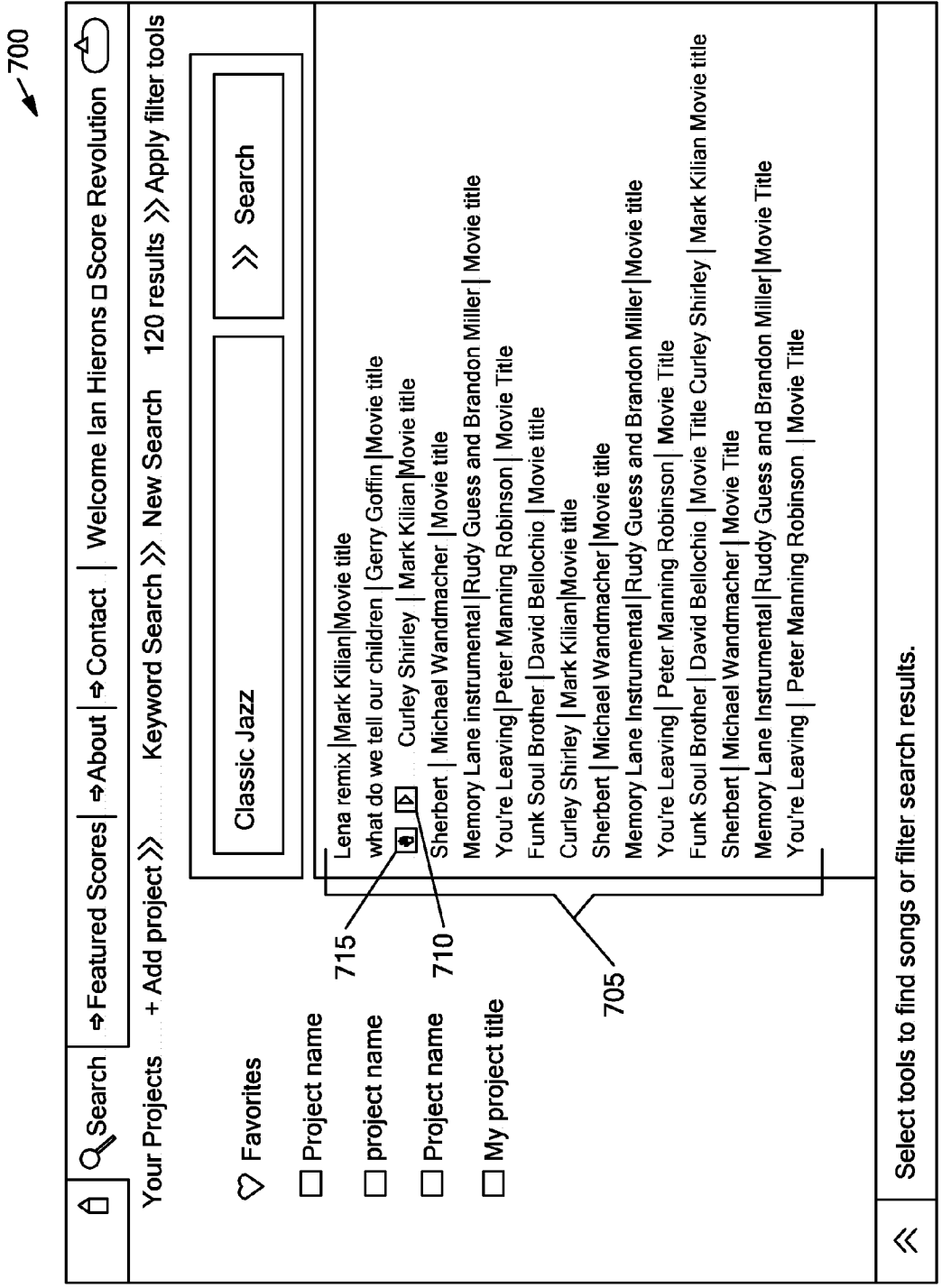
FIG. 7 is a user interface provided via the server computer that includes a panel showing results of a music search in accordance with an embodiment of the present disclosure.

FIG. 7 is an example of a user interface 700 showing results 705 of a keyword search when the user enters "Classic jazz". In one embodiment, the results 705 include the name of the track, the title of the movie that the track was played in, the name of the composer of the track, and/or any other information.

In one embodiment, when the user uses a cursor positioning device (e.g., a mouse, a track ball, a touch pack) to hover the cursor over a search result, a play button 710 is displayed for the search result over which the cursor is positioned. Selection of the play button 710 causes the user interface to play the track identified by the particular search result for which the play button 710 is displayed. In one embodiment, a waveform of the selected track is displayed during the playing of the track.

In one embodiment, keywords recognized in the database are underlined and displayed in a particular color while non-recognized keywords are displayed in a different color.

In one embodiment, recognized keywords that are also an item in one of the filter tools can add the associated filter tool and item selected to a filter tools dock at the bottom of the user interface 700.

In one embodiment, when the user uses his mouse or pointing device to cause the cursor to hover over a particular search result, a grab handle 715 is shown to allow the user to select the track and drag the track into a project or folder (e.g., illustrated under the column heading "Your projects") without expanding the track (as described in more detail below). In one embodiment, after the selected track is dragged in to a project folder, the user may open the project folder to locate the information about the track without having to perform a further search.

Figure 8:
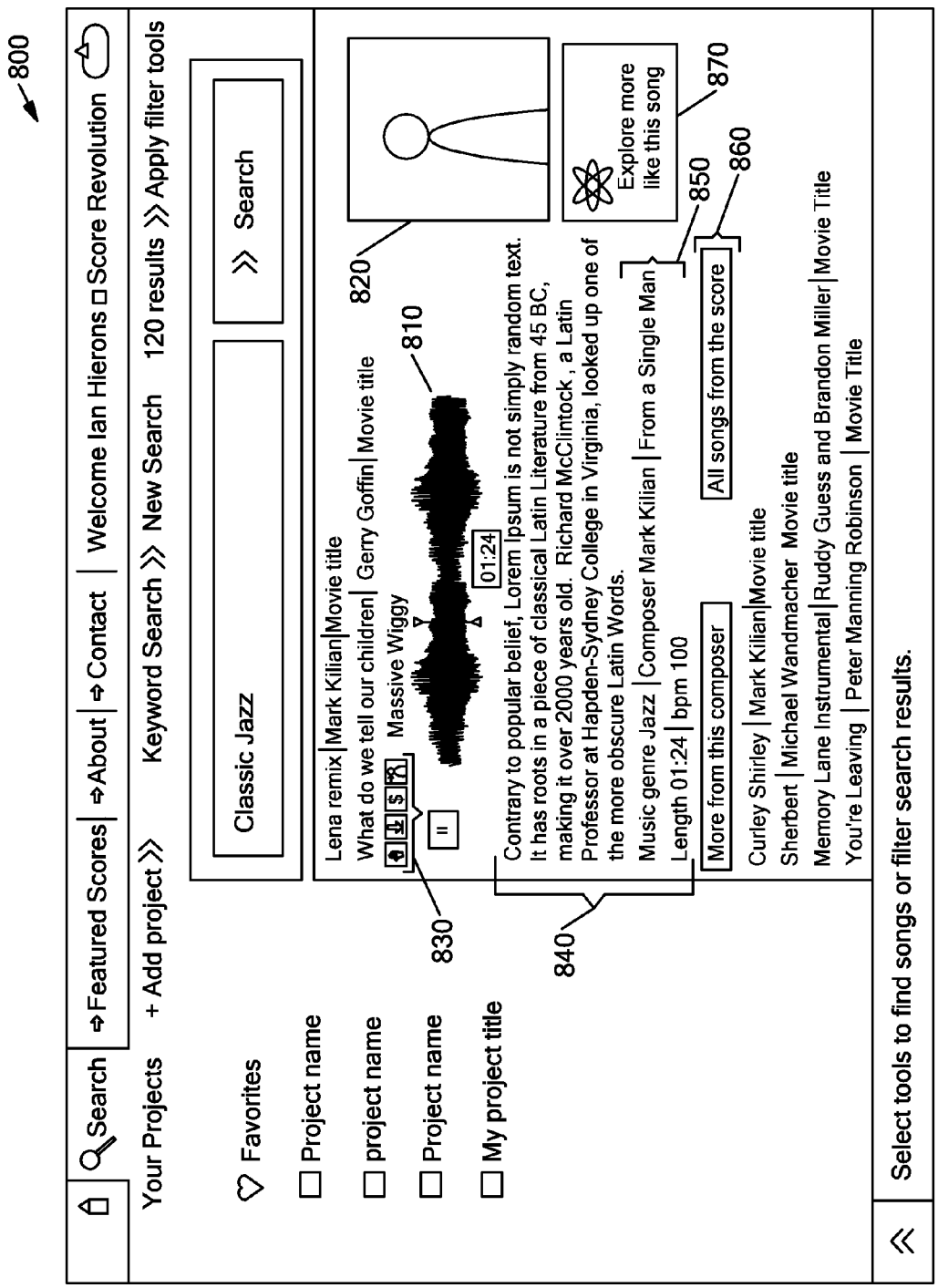
FIG. 8 is a user interface provided via the server computer that displays a waveform representation of a track that is being played in accordance with an embodiment of the present disclosure.

When the user selects a search result, in one embodiment the search result is expanded. FIG. 8 shows an embodiment of a user interface 800 displaying such an expansion. In one embodiment, as part of the expansion of the search result, a waveform representation 810 of the film music (or other media) is displayed. In one embodiment, the waveform representation 810 illustrates (e.g., with different colors) which part of the waveform has already been downloaded (e.g., streamed) to the media player for the user interface and which part has not yet been downloaded (e.g., streamed) from the server computer 110. In one embodiment, artwork 820 related to the film music is displayed. As described above, the expanded view can include one or more action buttons 830, an audio player displaying the waveform 810, a description 840 associated with the selected film music, itemized information 850 related to the selected film music (e.g., music genre, composer, movie source, length, bpm, etc.), more tracks 860 by either the same composer or full score, film artwork 820, and/or an "explore-more" button 870 that, when selected, provides the user with additional music that are acoustically similar to the music identified by the expended search result.

In one embodiment, the action buttons 830 include one or more of a license button enabling licensing of the film music, a share button enabling sharing of the search result identifying the music with one or more people, a grab button enabling dragging of the search result identifying the music to a folder for further actions, and a download button enabling downloading of the film music for licensed use (e.g., in a commercial setting after a license is obtained via the server computer 110).

In one embodiment, the share button enables the user to email the search result identifying the music to one or more other people. In one embodiment, the email includes a link that, when opened, cause the presentation of a webpage similar to the webpage 125 and shows the search result for the track with user interface elements that can be selected to play and/or download the track.

FIG. 9 is an example of a user interface 900 enabling a user to submit a quote request for a commercial license of particular media. In one embodiment, the user interface 900 enables the user to enter information for request a license, such as the Licensee Company Name 910 and Address 915, a Project Title 920, a Scene Description 925, Type of Media 930, a Term 935 of the license, Rights Requested 940, Effective Date 945, and Length of Use 950. Although shown with particular fields, the user interface 900 may request any number of different fields that a licensor may be interested in.

Figure 10:
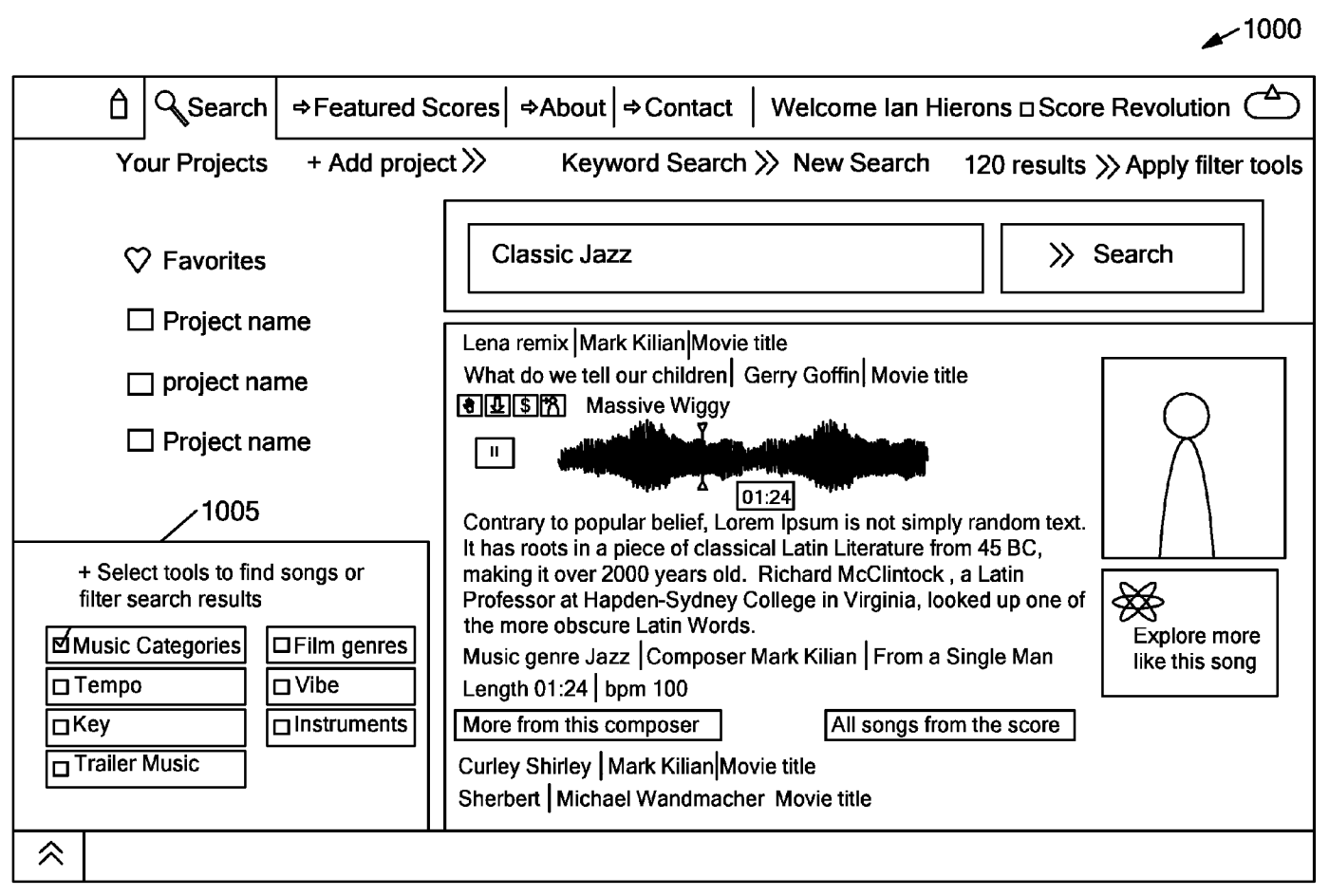

FIG. 10 is an example of a user interface 1000 that displays a set of filter tools 1005, such as, tools for filtering based on music categories, tempo, key, trailer music, film genres, vibe, and instruments.

Figure 11:
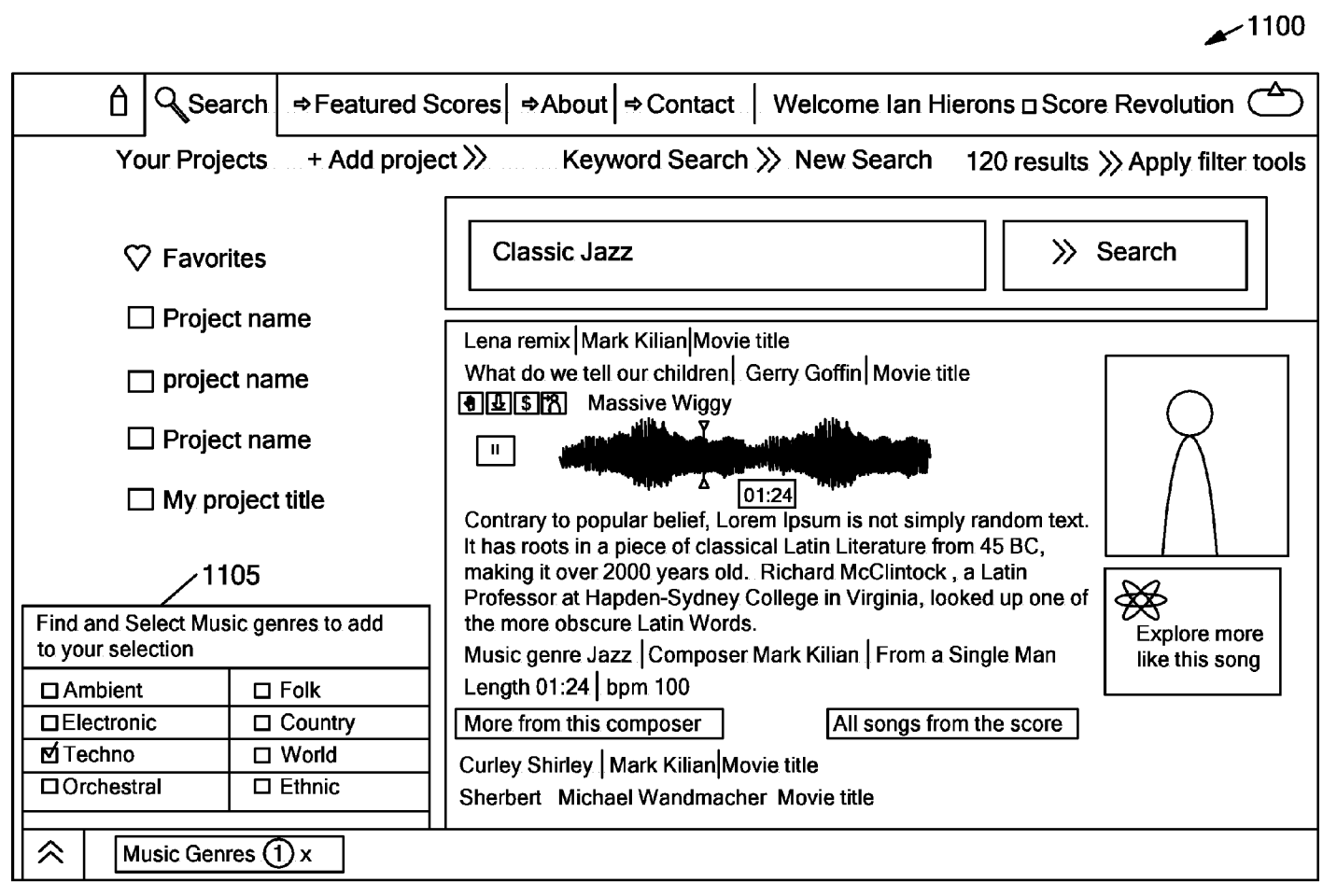

FIG. 11 shows an example of a user interface 1100 that displays a filter tool 1105 configured to filter based music genres, such as, for example, ambient, electronic, techno, orchestral, folk, country, world, and/or ethnic.

FIG. 12 is an example of a user interface 1200 that displays a filter tool 1225 configured to filter based on music genres, such as, for example, ambient, electronic, techno, orchestral, classical, rock, indie, punk, blues, folk, country, world, ethnic, jazz, urban, funk, and/or R&B. In FIG. 12, more than one category (e.g., "Techno" and "Jazz") can be selected to expand the search scope. Changing the selection of filtering options in the filter tools causes the update of the search results displayed in the search result panel 1210 at the lower-right portion of the screen image, without the user having to request a separate search. When more than one filter option is selected in the filter tool, a filter tool button 1205 is displayed on the dock area 1220. The selection of the filter tool button 1205 causes the display of the filter tool 1225.

Figure 13:
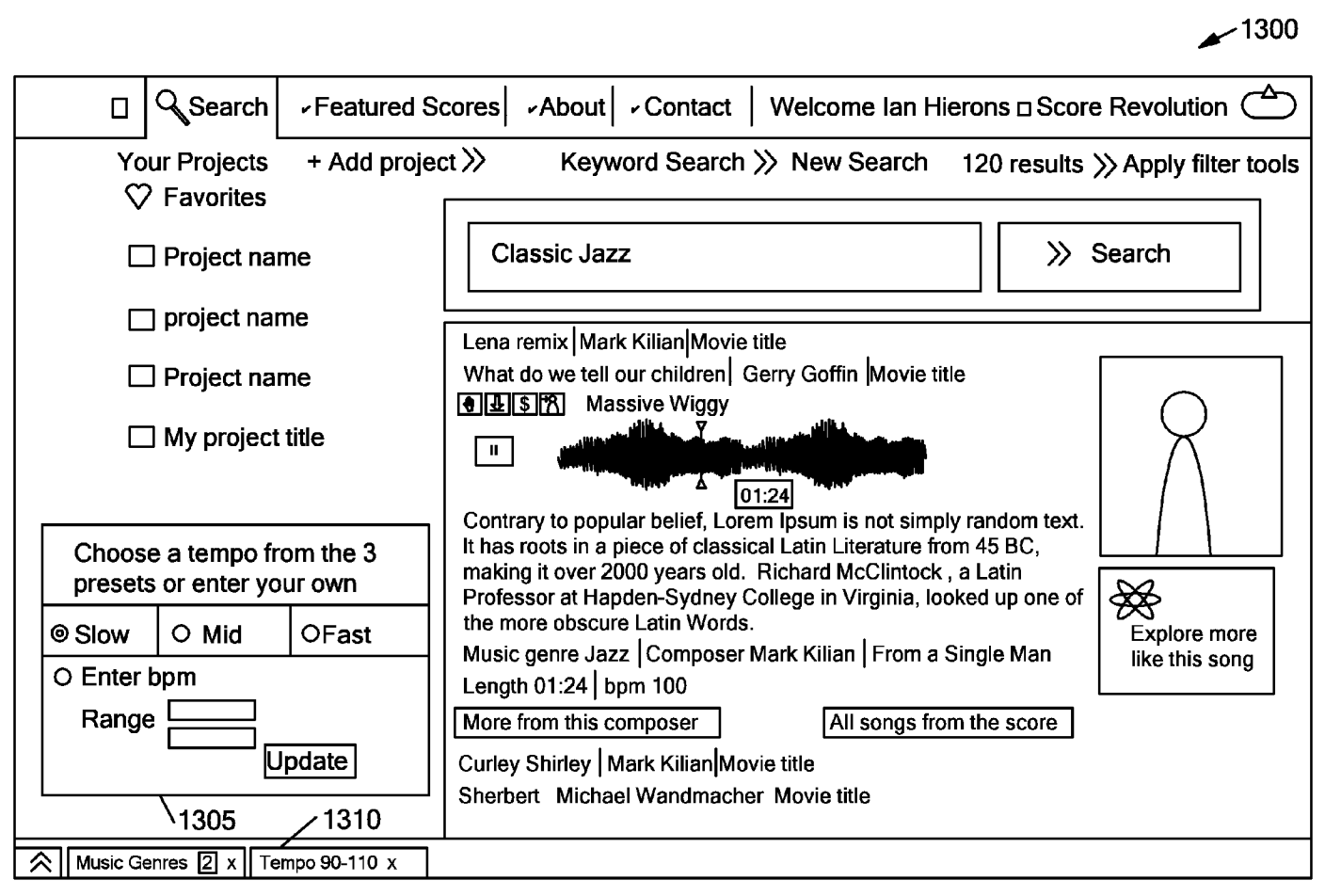

FIG. 13 shows an example of a user interface 1300 that displays a filter tool configured to filter based on tempo options. In one embodiment, the tempo filter tool 1305 is displayed to receive user selection of filter options based on tempo. When one or more options in the tempo filter tool 1305 is selected by the user, a tempo filter tool button 1310 is displayed in the dock area 1220, next to the music genres filter tool button 1205 that has an indication of numbers of options (e.g., two) selected in the music genres filter tool 1225 shown FIG. 12. In one embodiment, the tempo filter tool button 1305 shows the tempo option selected in the tempo filter tool 1305 (e.g., 90-110). When the tempo filter tool button 1305 is selected the tempo filter tool 1305 is displayed, which enables the user to select a tempo such as, for example, slow, mid, fast, and/or can enable the user to enter a range in terms of bpm (beats per minute).

Figure 14:
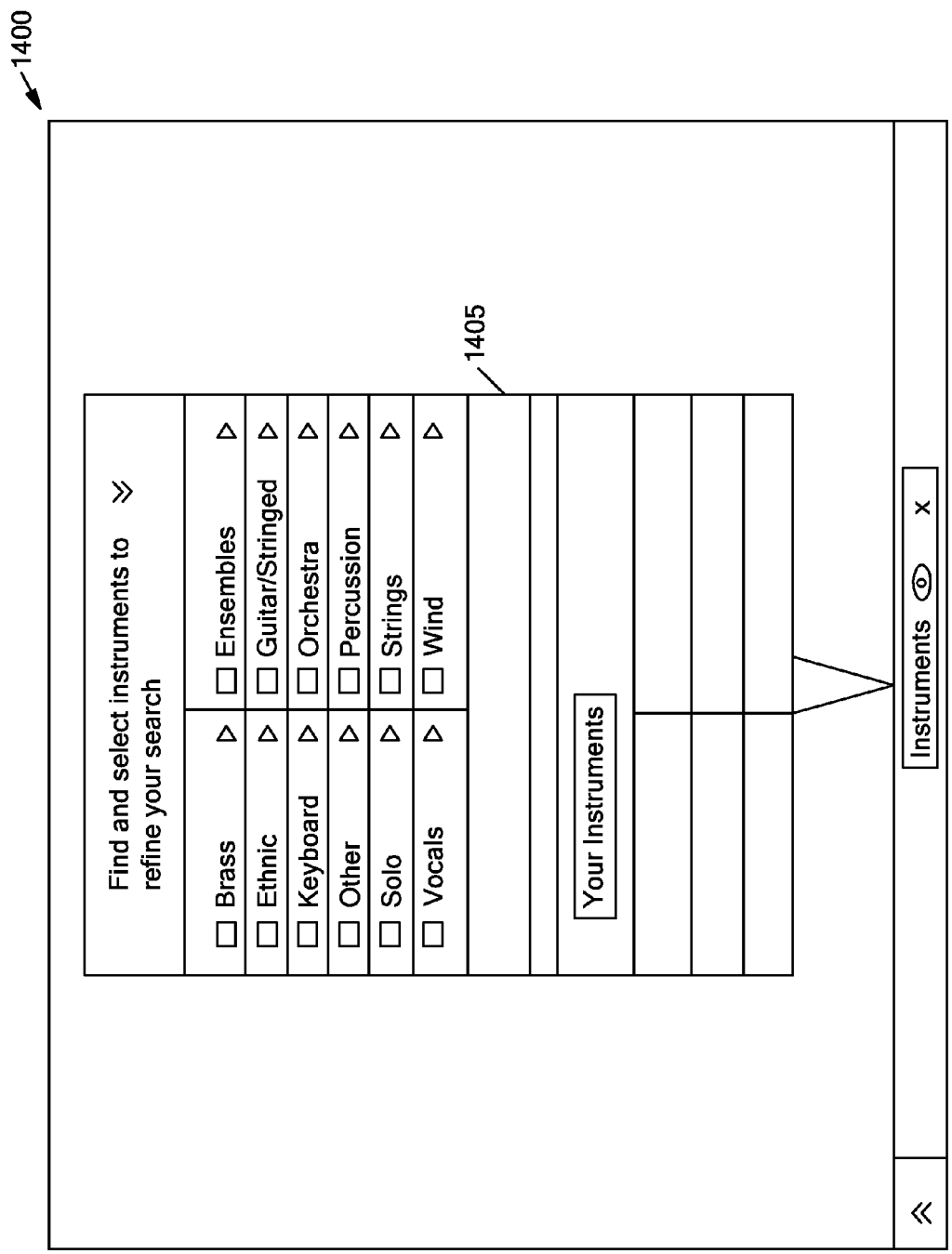
FIG. 14 is a user interface provided via the server computer that displays a filter tool configured to filter based on instrument in accordance with an embodiment of the present disclosure.

FIG. 14 is an example of a user interface 1400 that shows filter options for a filter tool configured to filter based on instrument. In one embodiment, the instrument filter tool 1405 includes category options such as brass, ethnic, keyboard, other, solo, vocals, ensembles, guitar/stringed, orchestra, percussion, strings, and/or wind instruments. In one embodiment, if a user selects one of the instrument categories in the filter tool 1405, a set of specific instruments in the selected category are presented to the user for selection. For example, if the user selects percussion instruments, a user interface element is displayed to allow the user to select one or more of bass drum, bongo, castanets, congas, cymbals, drum rolls, finger snaps, glockenspiel, bells, brushes, Chinese blocks, cuica, drum machine, drum, foot tapping, and/or gong. In one embodiment, one or more of these percussion instruments can be specified further with additional windows. For example, bells can include a bell tree, cow bells, sleigh bells, church bells, hand bells, tubular bells, etc. Similarly, other filter tools (e.g., music genre tool) can also use a hierarchical option menu for the selection of filter options. For example, music genre tool includes a window enabling the user to select one or more of classical electronic, rock/pop, world/ethnic, country/blues, jazz, and/or urban. In one embodiment, the user selected instrument options are displayed in the filter tool 1405 under the section labeled "Your Instruments".

FIG. 15 shows an example of a trailer tool 1505 and a film genre tool 1510. Although shown with particular fields, any number and type of field can be present in these filter tools.

Figure 16:
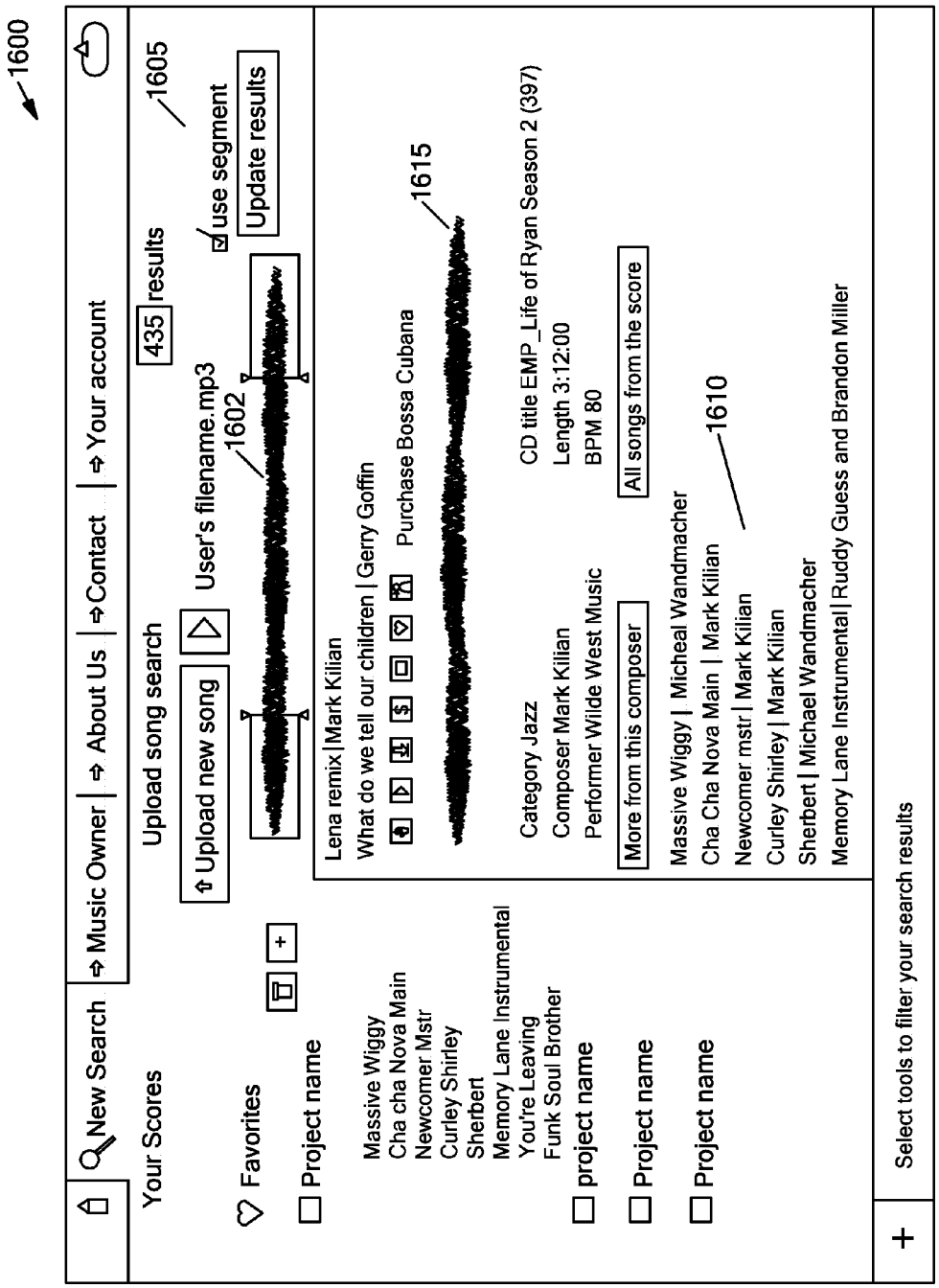
FIG. 16 is a user interface provided via the server computer that enables a user to upload a track in accordance with an embodiment of the present disclosure.

FIG. 16 shows an example of a user interface 1600 enabling a user to upload a track. In one embodiment, the user has uploaded a track and a waveform 1602 showing the uploaded track is displayed in upload track search window 1605. In one embodiment, a portion of the uploaded track waveform can be selected by the user to identify a segment of the uploaded track. After the acoustic attributes of the user identified segment of the uploaded track is determined from an acoustic analysis of the audio signals in the segment, the tracks in search results are presented in the order of decreasing similarity based on the acoustic attributes.

In one embodiment, search results window 1610 displays search results that are similar in some manner to the user identified segment of the uploaded track in acoustic attributes. In one embodiment, a waveform 1615 is displayed for a selected track (e.g., "What do we tell our children") in the search results.

In one embodiment, the filter tools can be used to filter the search results that are based on the acoustic similarity with the user identified segment of the upload track.

In FIG. 16, a folder representing a project can be selected to expand the section corresponding to the project folder to reveal the search results that have been saved under the project via the dragging of the grab handle 715 illustrated in FIG. 7 and similar handle shown in FIGS. 8, 10-12 and 16.

Figure 17:
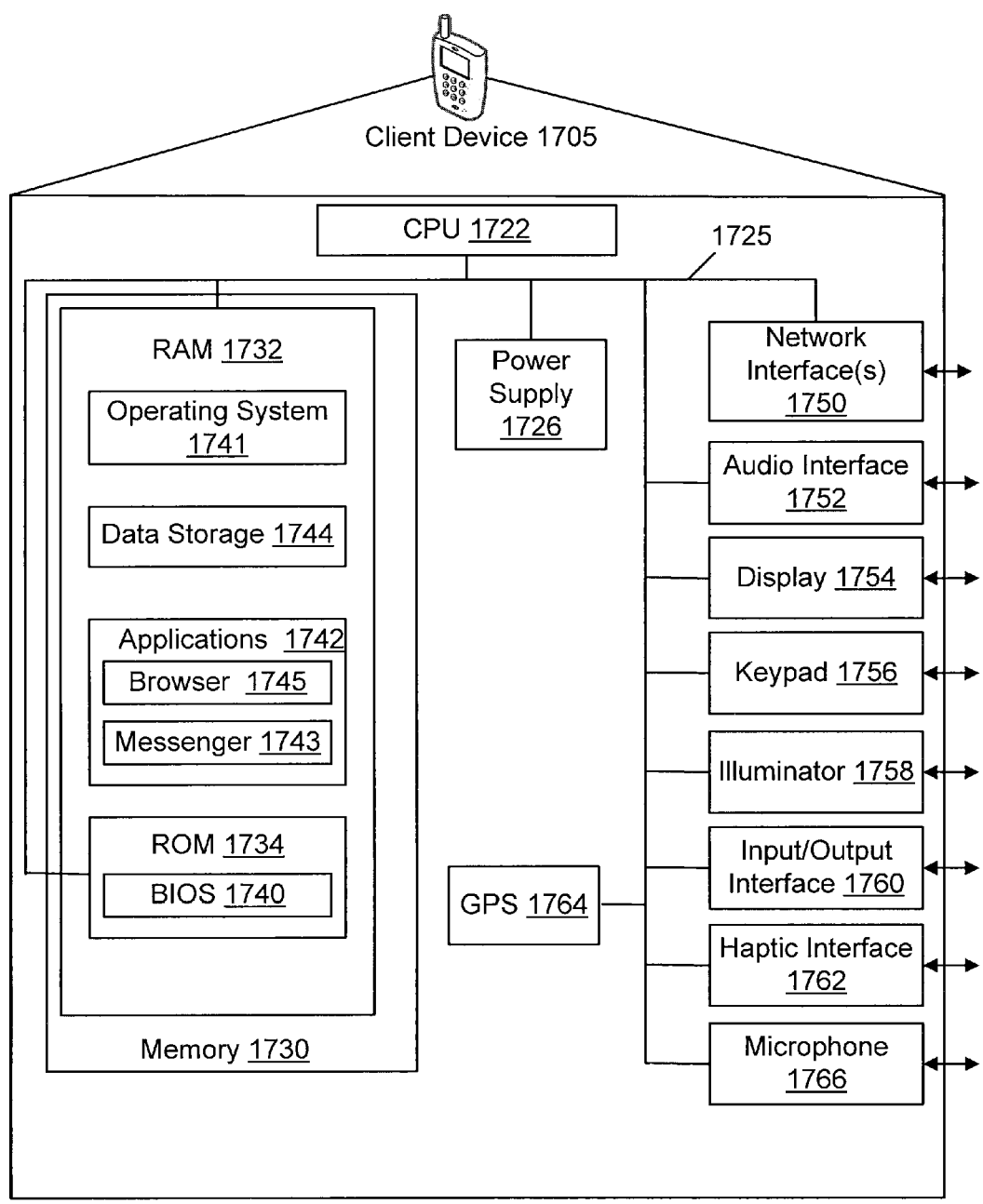
FIG. 17 is a schematic diagram illustrating a client device in accordance with an embodiment of the present disclosure.

FIG. 17 shows one example of a schematic diagram illustrating a client device 1705 (e.g., client device 105). Client device 1705 may include a computing device capable of sending or receiving signals, such as via a wired or wireless network. A client device 1705 may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a digital camera, a set top box, a wearable computer, an integrated device combining various features, such as features of the foregoing devices, or the like.

The client device 1705 may vary in terms of capabilities or features. Claimed subject matter is intended to cover a wide range of potential variations. For example, a cell phone may include a numeric keypad or a display of limited functionality, such as a monochrome liquid crystal display (LCD) for displaying text, pictures, etc. In contrast, however, as another example, a web-enabled client device may include one or more physical or virtual keyboards, mass storage, one or more accelerometers, one or more gyroscopes, global positioning system (GPS) or other location-identifying type capability, of a display with a high degree of functionality, such as a touch-sensitive color 2D or 3D display, for example.

A client device 1705 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

As shown in the example of FIG. 17, client device 1705 may include one or more processing units (also referred to herein as CPUs) 1722, which interface with at least one computer bus 1725. A memory 1730 can be persistent storage and interfaces with the computer bus 1725. The memory 1730 includes RAM 1732 and ROM 1734. ROM 1734 includes a BIOS 1740. Memory 1730 interfaces with computer bus 1725 so as to provide information stored in memory 1730 to CPU 1722 during execution of software programs such as an operating system 1741, application programs 1742, device drivers, and software modules 1743, 1745 that comprise program code, and/or computer executable process operations, incorporating functionality described herein, e.g., one or more of process flows described herein. CPU 1722 first loads computer executable process operations from storage, e.g., memory 1732, data storage medium/media 1744, removable media drive, and/or other storage device. CPU 1722 can then execute the stored process operations in order to execute the loaded computer-executable process operations. Stored data, e.g., data stored by a storage device, can be accessed by CPU 1722 during the execution of computer-executable process operations.

Persistent storage medium/media 1744 is a computer readable storage medium(s) that can be used to store software and data, e.g., an operating system and one or more application programs. Persistent storage medium/media 1744 can also be used to store device drivers, such as one or more of a digital camera driver, monitor driver, printer driver, scanner driver, or other device drivers, webpages, content files, playlists and other files. Persistent storage medium/media 1706 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Client device 1705 can also include one or more of a power supply 1726, network interface 1750, audio interface 1752, a display 1754 (e.g., a monitor or screen), keypad 1756, illuminator 1758, I/O interface 1760, a haptic interface 1762, a GPS 1764, and/or a microphone 1766.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Figure 18:
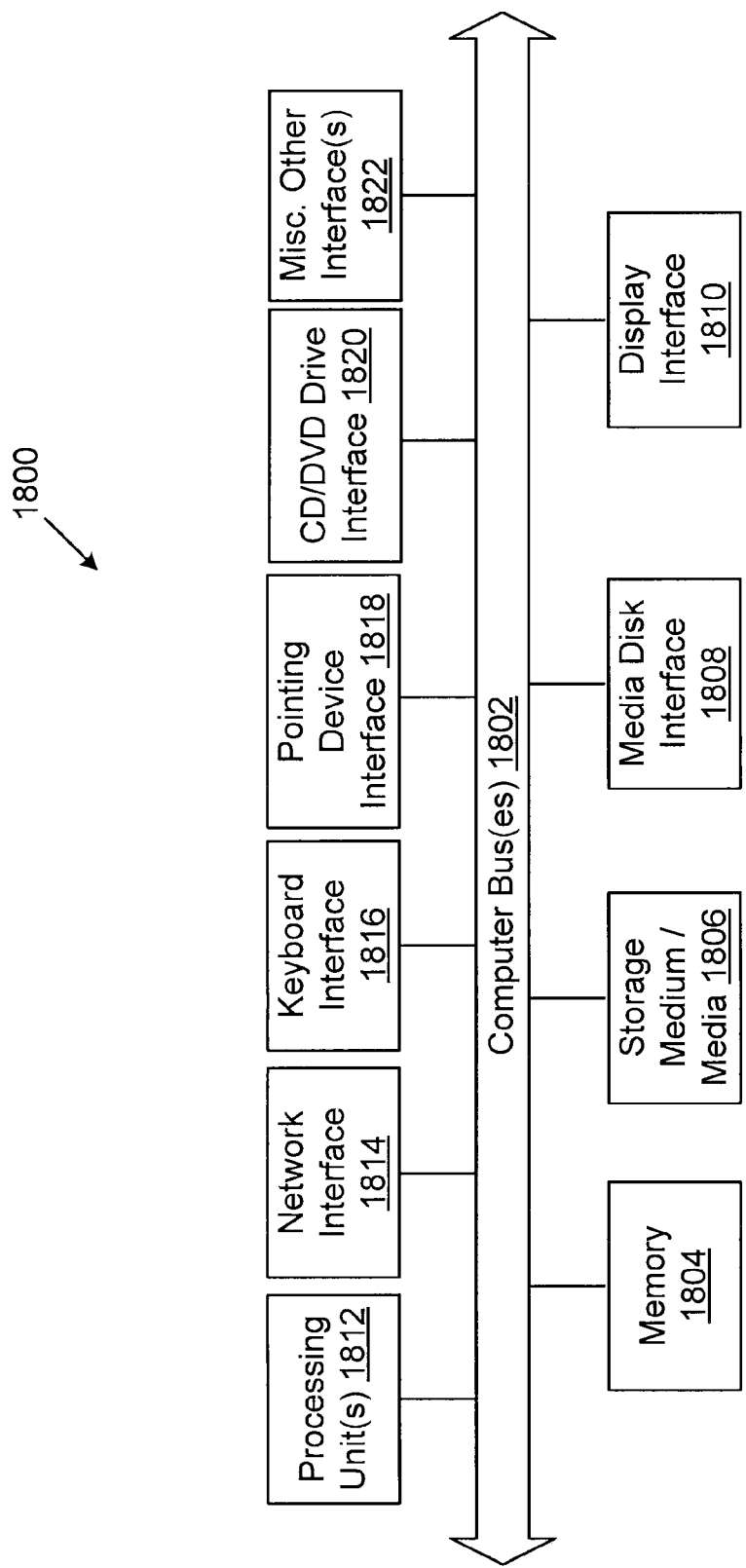
FIG. 18 is a block diagram of an internal architecture of a computing device in accordance with an embodiment of the present disclosure.

FIG. 18 is a block diagram illustrating an internal architecture of an example of a computer, such as server computer 110 and/or client computer 105, in accordance with one or more embodiments of the present disclosure. A computer as referred to herein refers to any device with a processor capable of executing logic or coded instructions, and could be a server, personal computer, set top box, smart phone, pad computer or media device, to name a few such devices. As shown in the example of FIG. 18, internal architecture 1800 includes one or more processing units (also referred to herein as CPUs) 1812, which interface with at least one computer bus 1802. Also interfacing with computer bus 1802 are persistent storage medium/media 1806, network interface 1814, memory 1804, e.g., random access memory (RAM), run-time transient memory, read only memory (ROM), etc., media disk drive interface 1808 as an interface for a drive that can read and/or write to media including removable media such as floppy, CD ROM, DVD, etc. media, display interface 1810 as interface for a monitor or other display device, keyboard interface 1816 as interface for a keyboard, pointing device interface 1818 as an interface for a mouse or other pointing device, and miscellaneous other interfaces not shown individually, such as parallel and serial port interfaces, a universal serial bus (USB) interface, and the like.

Memory 1804 interfaces with computer bus 1802 so as to provide information stored in memory 1804 to CPU 1812 during execution of software programs such as an operating system, application programs, device drivers, and software modules that comprise program code, and/or computer executable process operations, incorporating functionality described herein, e.g., one or more of process flows described herein. CPU 1812 first loads computer executable process operations from storage, e.g., memory 1804, storage medium/media 1806, removable media drive, and/or other storage device. CPU 1812 can then execute the stored process operations in order to execute the loaded computer-executable process operations. Stored data, e.g., data stored by a storage device, can be accessed by CPU 1812 during the execution of computer-executable process operations.

Persistent storage medium/media 1806 is a computer readable storage medium(s) that can be used to store software and data, e.g., an operating system and one or more application programs. Persistent storage medium/media 1806 can also be used to store device drivers, such as one or more of a digital camera driver, monitor driver, printer driver, scanner driver, or other device drivers, webpages, content files, playlists and other files. Persistent storage medium/media 1806 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method, comprising:
    providing, via a computing device, a window of a first webpage providing a user interface to search music, the user interface comprising a plurality of search tools including
        a keyword search tool having a first user interface element configured to receive a set of keywords from a user, the keyword search tool configured to identify a set of music search results based on matching with the keywords, and
        a set of filter tools having at least one second user interface element separate from the first user interface element and configured to receive a set of filtering options, the set of filter tools configured to filter the set of music search results based on the filter options specified in the at least one second user interface element,
        wherein the at least one second user interface element of the set of filter tools is capable of receiving the set of filtering options without the user providing input to the first user interface element of the keyword search tool,
        wherein the keyword search tool is configured to cause the set of filter tools to apply filter options corresponding to keywords received from the user in the keyword search tool, and
        wherein the set of filter tools are configured to cause the keyword search tool to receive keywords corresponding to filter options applied by user in the set filter tools;
    providing, by the computing device within the window of the first webpage, the set of music search results as a list of items in the first webpage, each of the items corresponding to a music piece;
    when an item in the list corresponding to a search result of the set of music search results is selected by the user in the user interface, expanding the item within the list corresponding to the selected music search result within the window of the first webpage to present, inside the list at a location near the selected search result, an explore-more button,
        an action button,
        an audio player showing a waveform representing audio of the selected music search result,
        a description of the selected music search result, and
        artwork associated with the search result;
    updating search results within the window without leaving the first webpage when the filter tools are used to modify search criteria; and in response to a user selection of the explore-more button,
   determining acoustic attributes of a piece of music in the search result in which the explore-more button is presented, the acoustic attributes based on numerical measurements of audio signals in the piece of music,
   initiating a new search using at least the acoustic attributes, wherein the acoustic attributes cannot be searched using the keyword search tool, and
   presenting results of the new search in a list ordered according to a degree of acoustic similarity with the piece of music.

2. The method of claim 1, wherein the action button comprises a license button enabling licensing of the music.

3. The method of claim 2, further comprising adjusting one or more terms of a commercial license based on an intended use.

4. The method of claim 1, wherein the action button comprises a share button enabling sharing of the music with another person.

5. The method of claim 1, wherein the action button comprises a grab button enabling dragging of the music to a folder.

6. The method of claim 1, wherein the action button comprises a download button enabling downloading of the music.

7. The method of claim 1, wherein the expanded search result further comprises itemized information relating to the music search result.

8. The method of claim 1, wherein the expanded search result further comprises additional results by either a composer or full score of the search result.

9. The method of claim 1, wherein the filter tools provide selectable filtering options via hierarchical groups.

10. The method of claim 1, further comprising obtaining, via the computing device, a quote request for a quote to commercially license the music search result.

11. A system, comprising:
   at least one processor; and
   memory storing instructions configured to instruct the at least one processor to provide a first webpage to configure a web browser to show a user interface in a window, the user interface configured to search music, the user interface comprising a plurality of search tools including
      a keyword search tool having a first user interface element configured to receive a set of keywords from a user, the keyword search tool configured to identify a set of music search results based on matching with the keywords,
      a set of filter tools having at least one second user interface element separate from the first user interface element and configured to receive a set of filtering options, the set of filter tools configured to filter the set of music search results based on the filter options specified in the at least one second user interface element,
         wherein the at least one second user interface element of the set of filter tools is capable of receiving the set of filtering options without the user providing input to the first user interface element of the keyword search tool,
         wherein the keyword search tool is configured to cause the set of filter tools to apply filter options corresponding to keywords received from the user in the keyword search tool, and
         wherein the set of filter tools are configured to cause the keyword search tool to receive keywords corresponding to filter options applied by user in the set filter tools; and
      a result panel configured to show the set of music search results as a list of items in the first webpage, each of the items corresponding to a music piece;
   wherein when an item in the list corresponding to a search result of the set of music search results is selected by the user in the user interface, the selected item within the list corresponding to the music search result expands within the result panel to present, inside the list at a location near the selected search result,
      an explore-more button,
      an action button,
      an audio player showing a waveform representation of audio of the selected music search result,
      a description of the selected music search result, and
      artwork associated with the search result;
   wherein when the filter tools are used to modify search criteria, the result panel updates search results displayed within the result panel without leaving the first webpage; and
   wherein a selection of the explore-more button causes,
      determining acoustic attributes of a piece of music in the search result in which the explore-more button is presented, the acoustic attributes based on numerical measurements of audio signals in the piece of music,
      initiating a new search using at least the acoustic attributes, wherein the acoustic attributes cannot be searched using the keyword search tool, and
      presenting results of the new search in a list ordered according to a degree of acoustic similarity with the piece of music.

12. The system of claim 11, wherein the action button comprises a license button enabling licensing of the music.

13. The system of claim 12, wherein the license button further enables adjustment of one or more terms of a commercial license of a music search result based on an intended use.

14. The system of claim 11, wherein the action button comprises a share button enabling sharing of the music with another person.

15. The system of claim 11, wherein the action button comprises a grab button enabling dragging of the music to a folder.

16. The system of claim 11, wherein the action button comprises a download button enabling downloading of the music.

17. The system of claim 11, wherein the expanded search result further comprises at least one of:
   itemized information relating to the music search result; and
   additional results by either a composer or full score of the search result.

18. The system of claim 11, wherein the user interface is configured to allow the user to selectively dock one or more buttons, representing respective one or more of the filter tools, at a dock area of the user interface presented in the first webpage; and when a button is selected from the one or more buttons docked in the dock area, a respective filter tool interface is presented to allow the user to select or deselect one or more filter options.

19. The system of claim 11, wherein the instructions to provide a user interface comprising a plurality of search tools including a set of filter tools further comprises instructions to provide a user interface comprising a plurality of search tools including a set of filter tools for filtering the music search results by matching criteria entered by the user with metadata associated with the music search results.

20. A non-transitory computer readable storage medium storing computer program instructions configured to instruct a computer processor to at least:

provide, via a computing device, a window of a first webpage providing a user interface to search music, the user interface comprising a plurality of search tools including a keyword search tool having a first user interface element configured to receive a set of keywords from a user, the keyword search tool configured to identify a set of music search results based on matching with the keywords, and a set of filter tools having at least one second user interface element separate from the first user interface element and configured to receive a set of filtering options, the set of filter tools configured to filter the set of music search results based on the filter options specified in at least one second user interface element, wherein the at least one second user interface element of the set of filter tools is capable of receiving the set of filtering options without the user providing input to the first user interface element of the keyword search tool, wherein the keyword search tool is configured to cause the set of filter tools to apply filter options corresponding to keywords received from the user in the keyword search tool, and wherein the set of filter tools are configured to cause the keyword search tool to receive keywords corresponding to filter options applied by user in the set filter tools;

provide, by the computing device within the window of the first webpage, the set of music search results as a list of items in the first webpage, each of the items corresponding to a music piece;

when an item in the list corresponding to a search result of the set of music search results is selected by the user in the user interface, expand the item within the list corresponding to the selected music search result within the window of the first webpage to present, inside the list at a location near the selected search result, an explore-more button, an action button, an audio player showing a waveform of audio of the selected music search result, a description of the selected music search result, and artwork associated with the search result;

update search results within the window without leaving the first webpage when the filter tools are used to modify search criteria; and in response to a user selection of the explore-more button, determine acoustic attributes of a piece of music in the search result in which the explore-more button is presented, the acoustic attributes based on numerical measurements of audio signals in the piece of music, initiate a new search using at least the acoustic attributes, wherein the acoustic attributes cannot be searched using the keyword search tool, and present results of the new search in a list ordered according to a degree of acoustic similarity with the piece of music.

\* \* \* \* \*